(12) United States Patent
Sommer et al.

(10) Patent No.: US 10,436,883 B2
(45) Date of Patent: Oct. 8, 2019

(54) LIGHT PROPAGATION TIME SENSOR WITH A CHARGE COMPENSATION DEVICE

(71) Applicant: PMD Technologies AG, Siegen (DE)

(72) Inventors: Michael Sommer, Siegen (DE); Jens Prima, Siegen (DE); Christoph Kamerow, Siegen (DE)

(73) Assignee: PMD Technologies AG, Siegen (DE)

( * ) Notice: Subject to any disclaimer, the term of this patent is extended or adjusted under 35 U.S.C. 154(b) by 377 days.

(21) Appl. No.: 15/328,734

(22) PCT Filed: Jul. 17, 2015

(86) PCT No.: PCT/EP2015/066399
§ 371 (c)(1),
(2) Date: Jan. 24, 2017

(87) PCT Pub. No.: WO2016/016018
PCT Pub. Date: Feb. 4, 2016

(65) Prior Publication Data
US 2017/0212225 A1  Jul. 27, 2017

(30) Foreign Application Priority Data
Jul. 28, 2014  (DE) .......................... 10 2014 214 733

(51) Int. Cl.
*G01C 3/08* (2006.01)
*G01S 7/487* (2006.01)
(Continued)

(52) U.S. Cl.
CPC .......... *G01S 7/4873* (2013.01); *G01S 7/4816* (2013.01); *G01S 7/4863* (2013.01); *G01S 7/4865* (2013.01); *G01S 17/36* (2013.01); *G01S 17/89* (2013.01)

(58) Field of Classification Search
CPC .... G01S 7/4863; G01S 7/4873; G01S 7/4816; G01S 7/4865; G01S 17/36; G01S 17/89
(Continued)

(56) References Cited

U.S. PATENT DOCUMENTS 9,137,521 B2 *  9/2015  Shin .................. G01S 17/89
2007/0158533 A1  2/2007  Bamji et al.

FOREIGN PATENT DOCUMENTS

DE   102005056774 A1   5/2007
DE   102011089642 A1   6/2012
DE   102013218647 A1   5/2014

OTHER PUBLICATIONS

International Search Report and Written Opinion Form PCT/ISA/210 and PCT/ISA/237, International Application No. PCT/EP/2015/066399, pp. 1-10, International Filing Date Jul. 17, 2015, search report dated Oct. 20, 2015.

* cited by examiner

*Primary Examiner* — Mark Hellner
(74) *Attorney, Agent, or Firm* — Bond Schoeneck & King, PLLC; George McGuire (57) ABSTRACT

The present invention provides a time-of-flight sensor (22) including at least one time-of-flight pixel (23) for demodulating a received modulated light beam (Sp2), wherein the time-of-flight pixel (23) comprises at least two integrating nodes (Ga, Gb) and the integration nodes (Ga, Gb) are connected to a device (500) for charge compensation, wherein the charge compensation device (500) comprises at least two SBI input transistors (M1, M2) which at a potential (Ua, Ub) of the integration nodes (Ga, Gb) which according to the amount exceeds an SBI threshold value ($U_{SBI}$) drive SBI current transistors (M3, M4) such that at both integration nodes (Ga, Gb) a compensating current ($i_k$) of the same level flows, wherein the source terminals of the SBI-current
(Continued)

transistors (M3, M4) are not connected to a supply voltage ($U_{DD}$) but are connected to a working voltage ($U_{RES}$, $U_{arb}$) (FIG. 7).

10 Claims, 8 Drawing Sheets

(51) Int. Cl.
    *G01S 17/36*     (2006.01)
    *G01S 17/89*     (2006.01)
    *G01S 7/481*     (2006.01)
    *G01S 7/486*     (2006.01)

(58) Field of Classification Search
    USPC ........................................................ 356/5.03
    See application file for complete search history.

LIGHT PROPAGATION TIME SENSOR WITH A CHARGE COMPENSATION DEVICE

CROSS-REFERENCE TO RELATED APPLICATION

This application is the U.S. National Stage filing under 35 U.S.C. 371 of international application number PCT/EP2015/066399, filed on Jul. 17, 2015, which, in turn, claims priority to German patent application 10 2014 214 733.6, filed 28 Jul. 2014, the entire disclosure of each of which are incorporated herein by reference.

The invention relates to a time-of-flight sensor including a device for charge compensation at integration nodes of a time-of-flight pixel according to the kind of the independent claim.

A time-of-flight sensor or generally a time-of-flight camera system in particular should encompass all time-of-flight (TOF) or 3D-TOF camera systems which derive time-of-flight information from the phase shift of emitted and received radiation. As time-of-flight or 3D-TOF cameras in particular PMD cameras with photonic mixing detectors (PMD) are suited such as described, inter alia, in the applications EP 1777747 A1, U.S. Pat. No. 6,587,186 B2 and DE 19704496 A1, and are available, for example, by the company 'ifm electronic GmbH' or 'PMD Technologies GmbH' as frame grabber O3D or as CamCube. The PMD camera enables, in particular, a flexible arrangement of the light source and of the detector which may be disposed both within a housing and separately. In particular, time-of-flight camera systems also should encompass systems in which the time-of-flight sensor only comprises one pixel or a small number of pixels.

For determining a distance or a corresponding phase shift of the reflected light the reflected light is mixed with the modulating signal within the PMD sensor as described in detail in DE 19704496 A1. This mixing provides an inphase signal (0°) and a signal offset by 180° from which in a known manner a distance can be determined. In order to improve the quality of the distance measurement it may be provided to shift the transmission modulation in a targeted manner, for example, by 90°, 180° or 270° and to determine a phase angle of the reflected signal with respect to the transmitted signal preferably by means of an IQ (inphase, quadrature) demodulation. This procedure is particularly useful for deriving redundant information, for example, to compensate various parasitic effects such as fixed pattern noise (FPN), background light or asymmetries of the sensor.

From DE 10 2004 016626 A1 and DE 10 2005 056774 A1, moreover, so-called SBI (suppressed background illumination) circuits are known which enhance the dynamic of a pixel by means of a pixel-specific suppression of background light.

It is an object of the invention to further improve the dynamic range of a time-of-flight sensor.

This object is advantageously achieved by the time-of-flight sensor according to the independent claim.

Advantageously a time-of-flight sensor comprising at least one time-of-flight pixel for demodulating received modulated light is provided, in which the time-of-flight pixel comprises at least two integration nodes, wherein the integration nodes are connected to a device for charge compensation. The charge compensation device comprises at least two SBI input transistors which at a potential of the integration nodes which reaches an SBI threshold value and/or exceeds the threshold in the direction of a saturation potential, drives SBI current transistors in such a way that each integration node of a time-of-flight pixel is supplied with a compensation current of the same level. Here, the source terminals of the SBI current transistors are not supplied with a supply voltage, but with a working voltage.

This procedure has the advantage that by means of an operation of the SBI current transistors independently from the supply voltage a greater margin for setting the SBI threshold can be provided.

Preferably a reset voltage is used as the working voltage for the SBI current transistors. By means of this procedure in an easy way it can be relied on an already existing potential and the margin for setting the SBI threshold can be extended without great effort.

In a further embodiment, it is provided to set the reset voltage for the process of resetting to a first reset potential ($U_{RES1}$) and for providing an SBI threshold value to a second, preferably lower reset potential ($U_{RES2}$).

In the following, the invention will be explained on the basis of exemplary embodiments with reference to the drawings.

The drawings schematically show:

In the following description of the preferred embodiments identical or similar components are designated by the same reference symbols.

Figure 1:
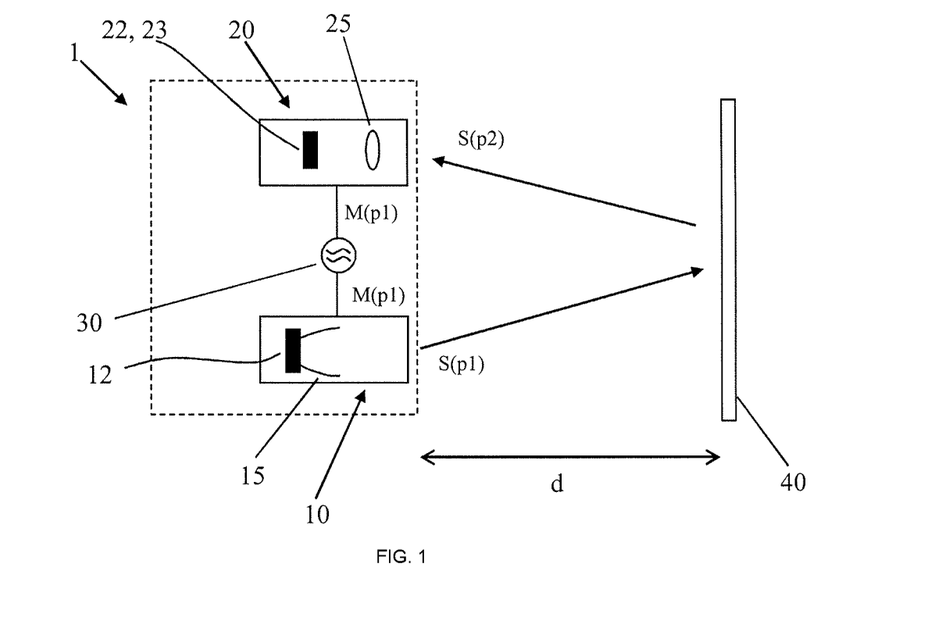
FIG. 1 a time-of-flight camera system.

FIG. 1 shows a measurement situation for an optical distance measurement including a time-of-flight camera which is known, for example, from DE 19704496 A1.

The time-of-flight camera system 1 comprises a transmitting unit or an illumination unit 10 including a light source 12 and an associated beam-shaping optics 15 and a receiving unit or time-of-flight camera 20 including a receiving optics 25 and a time-of-flight sensor 22. The time-of-flight sensor 22 comprises at least one time-of-flight pixel 23, preferably, however, a pixel array and is in particular constructed as a PMD sensor. The receiving optics 25 typically consists of several optical elements in order to improve the imaging characteristics. The beam shaping optics 15 of the transmitting unit 10 is preferably configured as a reflector.

The measuring principle of this arrangement is based substantially on the assumption that starting from the phase shift $\Delta\varphi$ of the emitted and received light the time-of-flight $t_L$ and thus the distance travelled by the received light can be determined. To this end the light source 12 and the time-of-flight sensor 22 are together supplied with a certain modulation frequency M(p1) with a first phase position p1 via a modulator 30. According to the modulation frequency the light source 12 emits an amplitude-modulated signal S(p1) with the first phase position p1. This signal or the electromagnetic radiation is reflected in the illustrated case by an object 40 and is incident on the time-of-flight sensor 11 as a reception signal S(p2) with a corresponding phase shift with a second phase position p2=p1+Δφ($t_L$) which is obtained due to the travelled distance. In the time-of-flight sensor 22 the modulation signal M(p1) is mixed with the received signal S(p2), and the phase shift Δφ($t_L$) or the object distance d is determined from the resulting signal.

Figure 2:
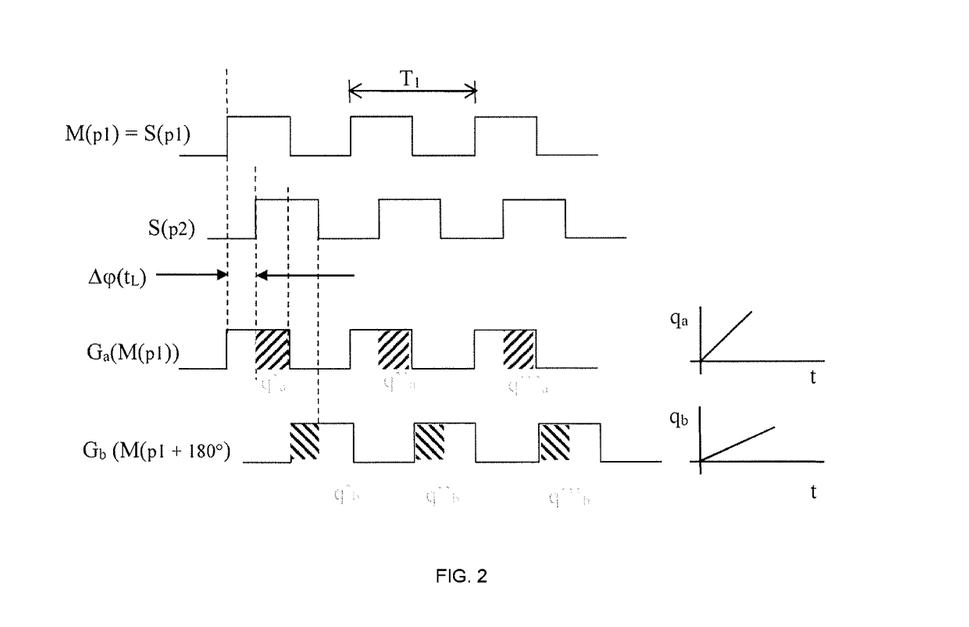
FIG. 2 the basic principle of demodulation.

This basic principle is shown schematically in FIG. 2. The upper curve shows the temporal curve of the modulation frequency M(p1) with which the illumination unit 12 and the time-of-flight sensor 22 are driven. The light reflected by the object 40 is incident on the time-of-flight sensor 22 as a reception signal S(p2) with a phase shift Δφ($t_L$) corresponding to its time-of-flight $t_L$. The time-of-flight sensor 22 accumulates the photonically generated charges q over several modulation periods in the phase position of the modulation frequency M(p1) in a first integration node Ga and in a phase position M(p1+180°) shifted by 180° in a second integration node Gb. From the ratio of the charges qa, qb accumulated in the first and second integration nodes Ga, Gb the phase shift Δφ and thus a distance d of the object can be determined.

Figure 3:
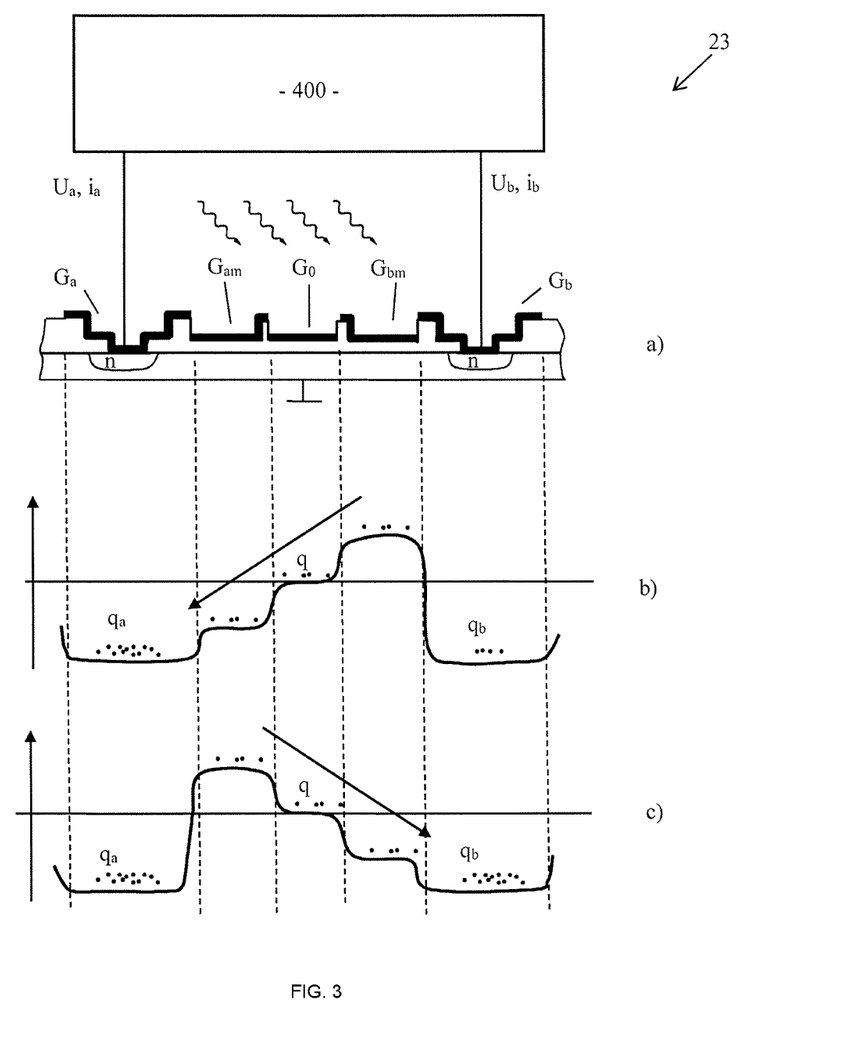
FIG. 3 a cross-section through a PMD pixel with potential distributions.

FIG. 3 shows a cross-section through a pixel of a photonic mixing detector such as known, for example, from DE 19704496 C2. The modulation photogates Gam, G0, Gbm are essentially configured transparent and are arranged in a light-sensitive area of a time-of-flight or PMD pixel. According to voltage applied to the modulation gates or modulation photogates Gam, G0, Gbm the photonically generated charges q are directed either to the one or to the other integration node Ga, Gb. Here "integration node" generally means a structure in which the charge accumulation occurs. This, for example, may be an accumulation gate in a MOS (metal oxide semiconductor) structure. It is moreover conceivable to configure the integration nodes as a diode structure.

FIG. 3b shows a potential curve in which the charges q flow in the direction of the first integration node Ga, and FIG. 3c shows a complementary potential curve in which the charges q flow in the direction of the second integration node Gb. The potentials may, for example, be preset according to the applied modulation frequency. Depending on the case of application the modulation frequencies are preferably in a range from 1 to 1000 MHz. At a modulation frequency of, for example, 1 MHz a period of one microsecond is obtained such that the modulation potential accordingly changes every 500 nanoseconds.

In FIG. 3a, moreover, a readout device 400 is shown, which optionally may already be a component of a time-of-flight sensor 22 or PMD sensor embodied as a CMOS. The integration nodes Ga, Gb integrate the photonically generated charges over a plurality of modulation periods. In a known manner, the voltage Ua, Ub then provided at the integration nodes Ga, Gb, for example, may be tapped with high impedance by the readout device 400. The integration times are preferably to be chosen such that for the light quantity to be expected the time-of-flight sensor or the integration nodes and/or the light-sensitive areas are not brought into saturation.

As an alternative to the measurement of the voltage Ua, Ub provided at the integration nodes Ga, Gb the current ia, ib flowing during a discharge can be measured.

Figure 4:
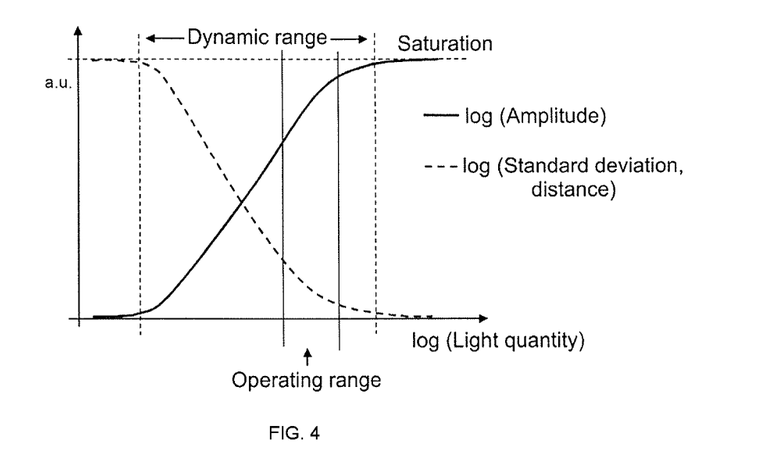
FIG. 4 a behavior of an amplitude with respect to the incident light quantity.

FIG. 4 shows schematically the dependency of an electrical variable, for example, a voltage amplitude of the time-of-flight pixel or an integration node on the light quantity. The light quantity is determined in a known manner from the luminous flux and the irradiation time.

Charge carriers q are generated in the photosensitive area in proportion to the light amount and distributed to the integration nodes Ga, Gb phase-correlated by means of the potentials provided at the modulation gates Gam, G0, Gbm corresponding to the modulation frequency. These divided charges $q_a$, $q_b$ can either be tapped with high impedance as voltage signal $U_a$, $U_b$ or voltage amplitude at the integration node or optionally be measured at a discharge of the integration nodes as current $i_a$, $i_b$. These electrical variables thus correspond to the phase-correlated luminous flux or the corresponding light quantity.

The possible dynamic range typically extends over several orders of magnitude. The extent of the dynamic range essentially depends on the surface area of the photosensitive layer of a time-of-flight pixel 23 as well as the capacitance $C_{int}$ of the integration nodes Ga, Gb and possibly also on dynamic enhancing elements in the readout circuit, for example special characteristics or active concepts for the suppression of direct components. The integration time $t_{int}$ of the time-of-flight sensor 22 or a single time-of-flight pixel 23 is preferably determined such that for the application the time-of-flight pixels 23 will not be brought into saturation. With decreasing light quantity or analog with decreasing integration time, however, the available charges or the potential at the integrating node decreases more and more and causes an increasing uncertainty in the distance determination inter alia due to the decreasing signal-to-noise ratio, such as shown by the dashed curve of the standard deviation in FIG. 4. The lower boundary of the operating range of the integration time should therefore preferably be selected such that an expected distance error is still within a permissible tolerance or standard deviation, wherein the upper limit preferably should be below the saturation.

Preferably a time-of-flight pixel 23 is provided with a so-called background light suppression or SBI (suppression of background illumination) circuit, which dependent on certain input variables discharges a part of the charges qa, qb provided at the integration nodes Ga, Gb in order to avoid or delay a saturation of the time-of-flight pixel 23 due to too high ambient light or useful signals.

Figure 5:
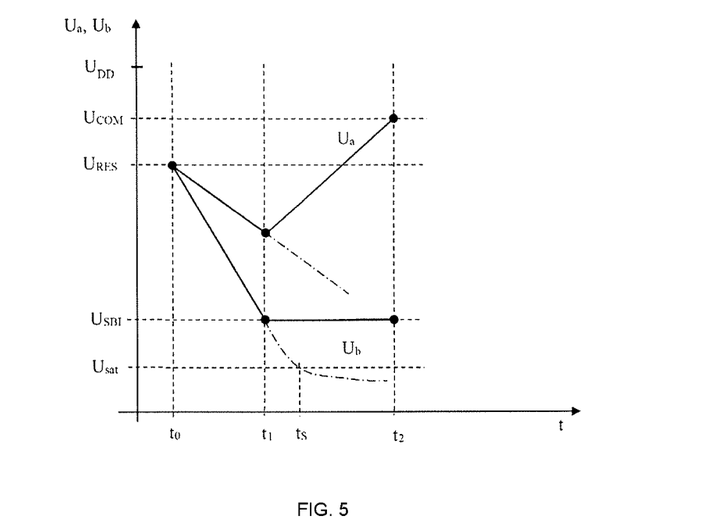
FIG. 5 a potential curve at a time-of-flight pixel with and without SBI use.

FIG. 5 shows a possible curve of the voltage Ua, Ub provided at the integration nodes Ga, Gb during a measurement. After a reset a reset voltage $U_{RES}$ with a positive potential is provided at the integration nodes Ga, Gb. In the illustrated example the charge compensation should not yet be effective at the start of the measurement at start time $t_0$. With increasing number of accumulated charge carriers or photoelectrons the voltage Ua, Ub at the integration nodes Ga, Gb decreases.

If in the further course the charges at the integration nodes Ga, Gb are not compensated the potential Ua, Ub at the integration nodes Ga, Gb decreases further as shown by a dashed line. In the illustrated case the second integration node Gb reaches a saturation potential $U_{sat}$ at a saturation time $t_s$ from which the integration node gets into saturation and the phase relation of the accumulated charge or the voltage provided gets lost. Saturation occurs when either due to an insufficient potential gradient in the semiconductor no further charge carriers can be accumulated or the dynamic range of the readout device 400 is left. Distance values which are determined from this time forward are erroneous.

In order to prevent or delay such a saturation it is known from DE 10 2005 056774 A1 to perform a charge compensation at both integration nodes Ga, Gb as soon as an integration node Ga, Gb reaches an SBI potential threshold value $U_{SBI}$, here at a first time t1. The charge compensation takes place by supplying a compensation current $i_k$ to both integration nodes Ga, Gb. The compensation current $i_k$ can, for example, be determined from the slope of the greater potential drop from (Ua, Ub) and be adjusted with a compensation factor k, if necessary:

$$i_k \cdot = C_{int} \cdot \frac{\Delta U}{\Delta t} \cdot k$$

It is also possible to provide the compensation current $i_k$ depending on an electrical variable $i_a$, $i_b$, Ua, Ub provided at an integrating node Ga, Gb preferably via a control system. Such control systems are, for example, known in various variants from DE 10 2004 016626 A1 and in particular from DE 10 2005 056774 A1 which are explicitly incorporated herein by reference. Such a control system is characterized in that the compensating current $i_k$ is predetermined by the control system such that the integration node, at which the SBI potential threshold $U_{SBI}$ is reached first, is kept constant in potential.

Such an approach is shown in FIG. 5 by the solid line. The accumulation of the charges as initially described is first carried out without supply of a compensation current $i_k$. In the illustrated example the second integration node Gb has the largest potential drop and reaches the SBI potential threshold $U_{SBI}$ first. By means of the SBI control it is now envisaged to provide the compensating current $i_k$ such that the potential at this integration node Gb is kept substantially constant. The first integration node Ga is supplied with a compensation current $i_k$ at the same level and is thus quasi overcompensated such that the potential increases with the beginning of the compensation. This overcompensation can take place until the first integration node Ga reaches a basic potential $U_{com}$ which is essentially defined by the circuitry.

Figure 6:
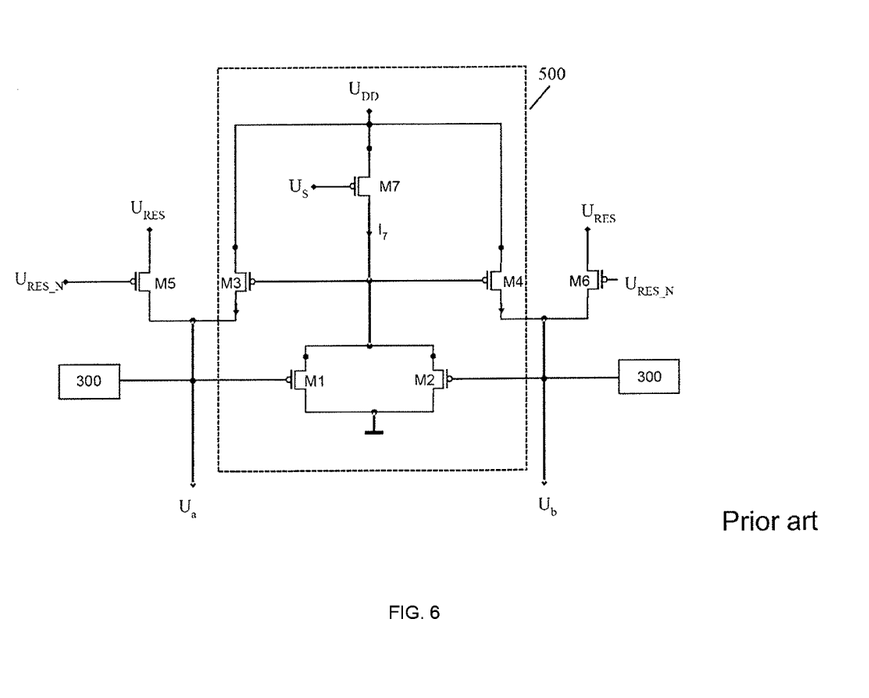
FIG. 6 a circuit for charge compensation known from the prior art.

FIG. 6 shows by way of example an SBI circuit 500 for charge compensation already known from DE 10 2005 056774 A1. Preferably, the SBI circuit 500 is an integral part of the readout device 400. In principle, however, a configuration independent from the readout device 400 is conceivable. The illustrated switches or transistors M1-M7 are configured as PMOS transistors in the present and in the following examples.

The implementations are, of course, not limited to PMOS structures, but may in particular also be configured as NMOS structures. Only the potential assignments are changed in the circuits. In the case of an NMOS implementation the supply voltage is a negative GND potential instead of a positive $U_{DD}$ potential, and the reference potential is at $U_{DD}$. The relations to the other potentials are changed accordingly. The SBI circuit 500 in combination with a control transistor M7 and a first and a second input transistor M1, M2 forms a source follower with double input via which a first and a second SBI current transistor M3, M4 are driven.

At the start of a measurement the gate potentials are typically set such that the transistors M1 to M6 are closed. Preferably, at the gate of transistor M7 already a control voltage $U_S$ is applied. However, no current flows through the transistor M7 because the transistors M1 and M2 are still closed.

The source terminals of the transistors M3, M4, and M7 are connected to the supply voltage $U_{DD}$. At the source terminals of the reset transistors M5, M6 a reset potential $U_{RES}$ is applied and the gates can be driven with a reset switching potential $U_{RES\_N}$.

The potentials Ua, Ub of the integration nodes Ga, Gb are each connected with a memory device 300 which is preferably configured as a source follower. In addition, the potential Ua, Ub of the integration nodes Ga, Gb is also applied to the gates of the SBI input transistors M1, M2.

If during a measurement the SBI threshold $U_{SDI}$ is not reached by any of the integration nodes Ga, Gb the SBI input transistors M1 and M2 as well as the SBI current transistors M3 and M4 are kept closed and there is no charge compensation. After completion of the measurement the integration nodes Ga, Gb are connected to the reset potential $U_{RES}$ by means of the reset switches M5, M6 by applying a reset switch signal $U_{RES\_N}$ and the integration nodes Ga, Gb are reset to this potential.

When during an integration the voltage Ua, Ub at one of the integration nodes Ga, Gb reaches the SBI threshold $U_{SBI}$ one of the SBI input transistors M1 or M2 is turned on such that a current $I_7$ flows from $U_{DD}$ through the control transistor M7 toward ground GND. The input transistor M1, M2 with the lower gate potential determines the output voltage of the source follower. Both SBI current transistors M3, M4 are driven with the output voltage, which then quasi as a current source supply a compensating current $i_k$ at the same level to both integrating nodes Ga, Gb.

When the SBI threshold is reached the compensation current $i_k$ is equal in amount to the photo current of the lower channel or the integration node Ga, Gb which has first reached the SBI threshold. When, as shown in FIG. 5, the second integration node Gb reaches the SBI threshold $U_{SBI}$ first the second input transistor M2 determines the output voltage of the source follower and thus the compensation current $i_k$.

The SBI switching threshold $U_{SBI}$ can be freely selected within the frame of certain defaults and is substantially dependent on the following factors.

$$U_{SBI} = U_S - |U_{th\_min\_a,b}| - n \cdot U_T \cdot \ln \frac{I_{ph}}{I_{0\_M3,4}}$$

Wherein $U_S$: control voltage, $U_{th\_min\_a,b}$: effective SBI threshold voltage at the SBI input transistors M1, M2; n: technology dependent fit parameter, $U_T$: temperature dependent voltage component; $I_{0\_M3,4}$: transfer current via transistor M3 or M4.

The drain current $I_D$ or compensation current $i_k$ through the SBI current transistors M3, M4 is obtained in a known manner from:

$$I_D = I_0 \cdot \exp\left(\frac{|U_{GS}| - |U_{th}|}{n \cdot U_T}\right),$$

wherein $I_0$: transfer current at the transistor, $U_{GS}$: gate-source voltage, $U_{th}$: threshold voltage, $U_T$: temperature dependent voltage component.

The SBI threshold $U_{SBI}$ is mainly determined by the dimensioning of the SBI and pixel circuit in chip design. In the operational state essentially only the control voltage $U_S$ at transistor M7 is available for the adjustment of the SBI threshold $U_{SBI}$. However, because of the interaction with the other potentials it is only variable within certain limits. A small change of $U_S$ is typically accompanied with a strong change in the source current (subthreshold range). This leads to a modification of the control characteristics of the SBI circuit and can in particular in the case of larger pixel matrices lead to an inacceptable increase in the total power consumption due to an increase of the drain current $I_7$. The setting of the SBI threshold $U_{SBI}$ is therefore only useful possible within narrow limits via the control voltage $U_S$.

Figure 7:
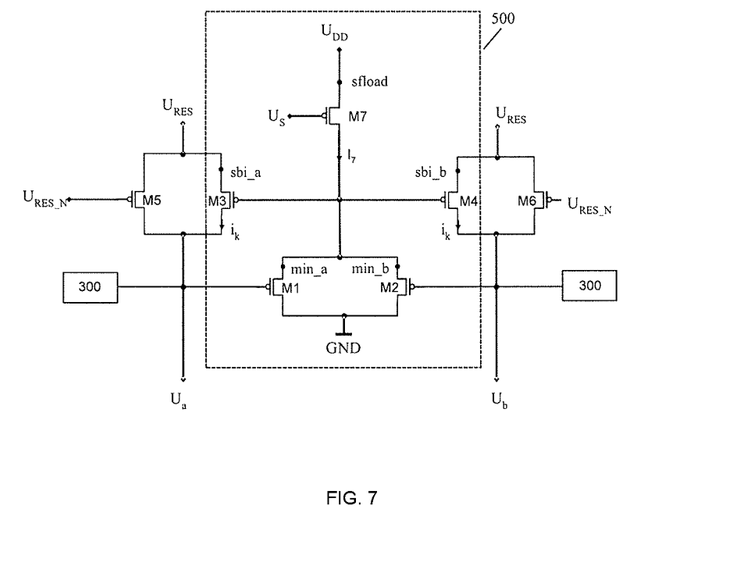
FIG. 7 a device for charge compensation according to the invention.

Thus, in order to overcome this limitation according to the invention, as shown in FIG. 7, it is suggested to connect the SBI current transistors M3 and M4 not to the supply voltage $U_{DD}$ but to a working potential, preferably a reset potential $U_{RES}$.

The SBI threshold $U_{SBI}$ in the circuit is given according to FIG. 7 by:

$$U_{SBI} = U_S + (U_{RES} - U_{DD}) - |U_{th\_min\_a,b}| +$$
$$(|U_{th\_sflood}| - |U_{th\_SBI\_a,b}|) - n \cdot V_T \cdot \ln\frac{I_{ph}}{I_{0\_M3,4}}$$

Wherein $U_{th\_min\_a,b}$: effective threshold voltage of the SBI input transistors M1, M2; $I_{0\_M3,4}$: technology dependent transfer current via transistors M3 and M4, respectively. The points for the respective voltage taps are indicated in the figures.

In this way the SBI threshold $U_{SBI}$ can be set not only via the control voltage $U_S$, but in addition, with a significantly larger setting range, also by means of the difference: $U_{RES} - U_{DD}$. In this case, the change in the effective threshold voltage $U_{th\_min\_a,b}$ of the SBI input transistors M1, M2 results in a further contribution due to the body effect.

While the circuit according to FIG. 6 is based on a single reset voltage $U_{RES}$ and a little variable SBI threshold $U_{SBI}$ the procedure according to the invention allows a setting of the SBI threshold value $U_{SBI}$ over a larger range, in particular also over a targeted setting of the working potential or the reset voltage $U_{RES}$.

Figure 8:
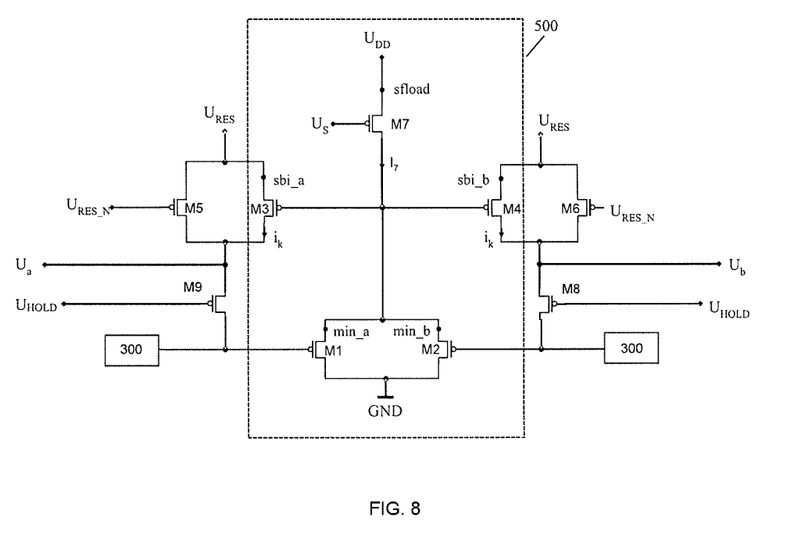
FIG. 8 a device for charge compensation according to the invention with hold transistors.

FIG. 8 shows a further embodiment in which the integration nodes Ga, Gb are connected to the storage device 300 via a hold transistor M8, M9.

Further, the SBI threshold $U_{SBI}$ can be adapted, for example, to the buried channel collapse voltage of the PMD sensor.

Moreover, the reset voltage $U_{RES}$ as well as the saturation voltage $U_{sat}$ can be set to a value below the supply voltage $U_{DD}$ in order to avoid charge losses, for example, by the hold jump at the end of the integration.

In particular, the maximum swing of the integration voltages Ua, Ub can be varied by the approach according to the invention.

The generation of the reset voltage $U_{RES}$ can be configured such that at least two different reset voltages $U_{RES1,2}$ can be generated. In this way, e.g. the starting point of the integration and the threshold of the SBI circuit 500 can be set independently of each another.

Figure 9:
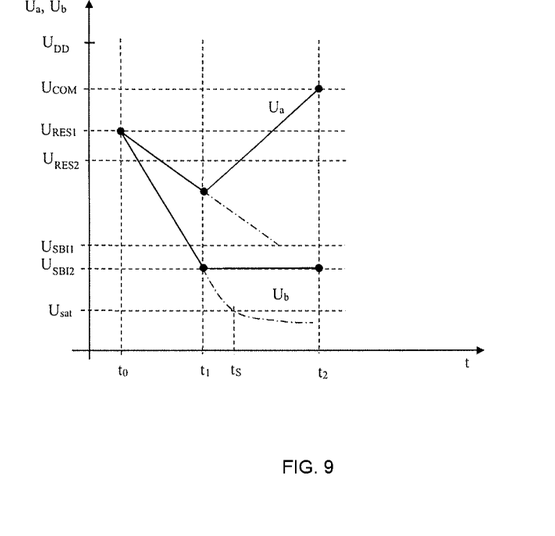
FIG. 9 a potential curve at a time-of-flight pixel with variable reset voltage.

Such an approach is shown by way of example in FIG. 9. At the start time $t_0$ the integration nodes Ga, Gb are at the first reset potential $U_{RES1}$. After the start of the integration the reset switches are closed such that a change in the reset voltage $U_{RES}$ does no longer affect the charge integration.

According to the invention it is provided to further decrease the reset voltage $U_{RES}$ after the start time $t_0$ and thus to increase the difference $U_{RES} - U_{DD}$ relevant for the SBI threshold $U_{SBI}$. With $U_{RES2} < U_{RES1}$ follows $U_{SBI2} < U_{SBI1}$. By such an approach, as shown in FIG. 9, the dynamic of the time-of-flight pixel or the time-of-flight sensor can be further increased.

Figure 10:
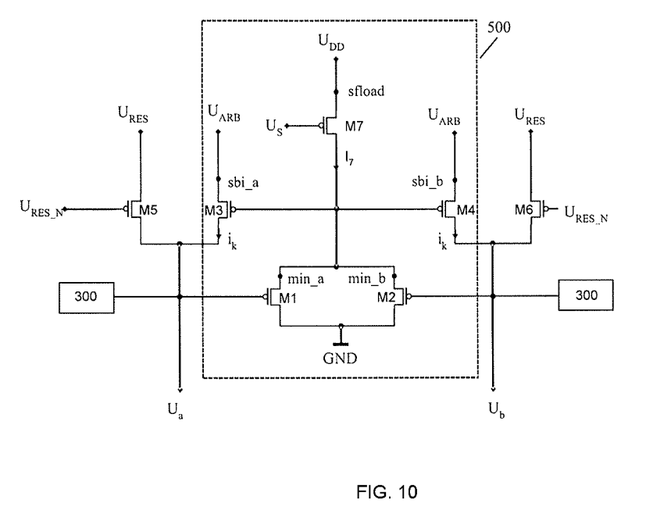
FIG. 10 a circuit according to FIG. 6 with a working potential at the SBI current transistors.

In a further embodiment according to FIG. 10 it can also be provided to apply an own working potential $U_{ARB}$ at the SBI current transistors M3, M4. By means of this the working potential can be set independently from the requirements of a reset potential $U_{RES}$, wherein for the potential distribution applies:

$GND < U_{sat} < U_{SBI} < U_{ARB} < U_{DD}$ $GND < U_{sat} < U_{SBI} < U_{RES} < U_{DD}$

REFERENCE LIST 1 time-of-flight camera system
10 illumination unit, transmitter
20 receiver, time-of-flight camera
12 light source
22 time-of-flight sensor
30 modulator
$\Delta\varphi(t_L)$ time-of-flight specific phase shift
$\varphi_{var}$ phase position
$\varphi_0$ basic phase
$M_0$ modulation signal
p1 first phase
p2 second phase
Sp1 transmission signal with first phase
Sp2 receiving signal with second phase
Ga, Gb integration nodes
Ua, Ub voltages at the integration nodes
d object distance
300 storage device
400 readout circuit
500 SBI circuit, charge compensating device
$U_{com}$ basic potential
$U_{SBI}$ SBI threshold
$U_{RES}$ reset voltage
$U_{RES\_N}$ reset switching potential
$U_{DD}$ supply voltage
$U_S$ control voltage
$U_{th}$ threshold voltage
$U_{sat}$ saturation potential
M1 . . . switches/transistors
M1, M2 SBI input transistors
M3, M4 SBI current transistors
M5, M6 reset switches
M7 control transistor
M8, M9 hold transistor

The invention claimed is:

1. Time-of-flight sensor including at least one time-of-flight pixel (23) for demodulating a received modulated light beam,
  wherein the time-of-flight pixel comprises a first and second integration node and the first and second integration nodes are connected to a device for charge compensation,
  wherein the charge compensation device comprises a first and a second SBI input transistor, a control transistor, and first and a second SBI current transistor,
  wherein a source terminal of the control transistor is connected to a supply voltage, a gate terminal of the control transistor to a control potential and a drain terminal of the control transistor to the source terminals of the SBI input transistors and the gates of the first and the second SBI current transistor, wherein the gates of the first and the second SBI input transistor are connected to the first and the second integration node and the drain terminals are connected to a reference potential, wherein the device for charge compensation is configured such that, as soon as one of the potentials at the integration nodes reaches a SBI threshold and/or exceeds the threshold in the direction of a saturation potential a working point at the SBI current transistors is set such that at both integration nodes a compensating current with the same level flows, wherein the source terminals of the SBI current transistors are not connected to a supply voltage but to a working voltage.

2. Time-of-flight sensor according to claim 1, wherein the working voltage for the SBI current transistors is a reset voltage.

3. Time-of-flight sensor according to claim 2, wherein the reset voltage for resetting the integration nodes is set to a first potential and for setting an SBI threshold to a second potential.

4. Time-of-flight camera system including a time-of-flight sensor including at least one time-of-flight pixel for demodulating a received modulated light beam, wherein the time-of-flight pixel comprises a first and second integration node and the integration nodes are connected to a device for charge compensation, wherein the charge compensation device comprises a first and a second SBI input transistor, a control transistor, and first and a second SBI current transistor, wherein a source terminal of the control transistor is connected to a supply voltage, at a gate terminal of the control transistor to a control potential and at a drain terminal of the control transistor to the source terminals of the SBI input transistors and the gates of the first and the second SBI current transistor, wherein the gates of the first and the second SBI input transistor are connected to the first and the second integration node, and the drain terminals are connected to a reference potential, wherein the device for charge compensation is configured such that, as soon as one of the potentials at the integration nodes reaches a SBI threshold and/or exceeds the threshold in the direction of a saturation potential a working point at the SBI current transistors is set such that at both integration nodes a compensating current with the same level flows, wherein the source terminals of the SBI current transistors are not connected to a supply voltage but to a working voltage.

5. Time-of-flight sensor according to claim 2, further comprising reset transistors for resetting said integration nodes to said reset voltage.

6. Time-of-flight sensor according to claim 1, wherein the charge compensation device comprises only one control transistor whose drain terminal is connected to the source terminals of the SBI input transistors and to the gates of the first and second SBI current transistors.

7. Time-of-flight camera system according to claim 4, wherein the working voltage for the SBI current transistors is a reset voltage.

8. Time-of-flight camera system according to claim 7, wherein the reset voltage for resetting the integration nodes is set to a first potential and for setting an SBI threshold to a second potential.

9. Time-of-flight camera system according to claim 7, wherein the time-of-flight sensor further comprises reset transistors for resetting said integration nodes to said reset voltage.

10. Time-of-flight camera system according to claim 4, wherein the charge compensation device comprises only one control transistor whose drain terminal is connected to the source terminals of the SBI input transistors and to the gates of the first and second SBI current transistors.

* * * * *

UNITED STATES PATENT AND TRADEMARK OFFICE
CERTIFICATE OF CORRECTION

PATENT NO. : 10,436,883 B2  
APPLICATION NO. : 15/328734  
DATED : October 8, 2019  
INVENTOR(S) : Michael Sommer, Jens Prima and Christoph Kamerow Page 1 of 1

It is certified that error appears in the above-identified patent and that said Letters Patent is hereby corrected as shown below:

In the Claims

Column 8, Line 49 Claim 1, after the word pixel, please delete "(23)"  
Column 9, Line 27 Claim 4, after the word voltage, please delete "at"

Signed and Sealed this  
Eighteenth Day of February, 2020

Andrei Iancu  
*Director of the United States Patent and Trademark Office*